United States Patent
Fetterhoof et al.

(10) Patent No.: US 7,597,062 B2
(45) Date of Patent: Oct. 6, 2009

(54) AUTOMATED MACHINE AND RELATED METHODS FOR SEASONING MEAT

(75) Inventors: Keith D. Fetterhoof, Lewistown, PA (US); Cloyd D. Bowsman, Honey Grove, PA (US)

(73) Assignee: Baupost Group LLC, Mifflintown, PA (US)

( * ) Notice: Subject to any disclaimer, the term of this patent is extended or adjusted under 35 U.S.C. 154(b) by 0 days.

(21) Appl. No.: 11/150,056

(22) Filed: Jun. 10, 2005

(65) Prior Publication Data

US 2006/0134283 A1 Jun. 22, 2006

Related U.S. Application Data (60) Provisional application No. 60/637,415, filed on Dec. 17, 2004.

(51) Int. Cl.
*B05C 19/04* (2006.01)

(52) U.S. Cl. .......................... 118/13; 118/24; 118/308; 118/309; 118/DIG. 16; 99/494

(58) Field of Classification Search ............... 118/13, 118/19, 24, 25, 308, 309, DIG. 6; 99/494; 426/289; 239/219, 220, 221; 366/153.3, 366/297–301, 325.92
See application file for complete search history.

(56) References Cited

U.S. PATENT DOCUMENTS

| | | | | |
|---|---|---|---|---|
| 3,014,451 | A | * | 12/1961 | Rhodes ........................ 118/24 |
| 3,130,074 | A | * | 4/1964 | Read et al. ................... 118/682 |
| 3,198,655 | A | * | 8/1965 | Gisiger ........................ 427/212 |
| 3,232,210 | A | * | 2/1966 | Ogle ............................. 99/516 |
| 3,667,654 | A | * | 6/1972 | Holley ......................... 222/336 |
| 3,735,726 | A | * | 5/1973 | Butler ........................... 118/24 |
| 3,978,250 | A | * | 8/1976 | Greten ......................... 427/201 |
| 4,907,720 | A | * | 3/1990 | Henson et al. ................. 222/55 |
| 5,090,593 | A | * | 2/1992 | Ejike ............................. 222/1 |
| 5,865,293 | A | * | 2/1999 | Napadow ..................... 198/495 |
| 6,513,450 | B1 | * | 2/2003 | Gore et al. ..................... 118/13 |
| 6,551,401 | B1 | * | 4/2003 | Winistorfer et al. .......... 118/303 |
| 2002/0034565 | A1 | * | 3/2002 | van Esbroeck et al. ...... 426/129 |

* cited by examiner

*Primary Examiner*—Laura Edwards
(74) *Attorney, Agent, or Firm*—Ropes & Gray LLP (57) ABSTRACT

The invention, in various embodiments, is directed to machines related methods for automatedly coating a sample with a particulate. In some embodiments, the sample is a food product, such as poultry, and the particulate includes a seasoning, such as salt.

21 Claims, 5 Drawing Sheets

AUTOMATED MACHINE AND RELATED METHODS FOR SEASONING MEAT

CROSS-REFERENCE TO RELATED APPLICATIONS

This application claims priority under 35 U.S.C. §119(e) to U.S. Provisional Application Ser. No. 60/637,415, filed on Dec. 17, 2004, entitled AUTOMATED MACHINE FOR SALTING CHICKEN, which is expressly incorporated herein by reference in its entirety.

TECHNICAL FIELD

The invention relates generally to systems and methods for seasoning meat. More particularly, in various embodiments, the invention pertains to an automated system and related methods for seasoning the exteriors and interiors of poultry. In various implementations, the seasoning includes or is predominantly salt.

BACKGROUND

Kosher poultry, such as chickens, are typically prepared using an assembly line approach. In various conventional approaches, after the poultry are slaughtered, they are shackled onto trolleys by their legs and hung from a conveyor line so that they can move throughout the plant for processing. Processing includes, but is not limited to, bleeding, washing, trimming, and cleaning.

Most of the process is automated and performed by machine. For example, after chickens are bled and washed, they are passed through a plucking machine. The shackled chickens are carried through the plucking machine via the conveyor line. Upon their exit, they are stripped of most, if not all, of their feathers.

Some processing requires human workers to process the chickens while the chickens move along the assembly line. Employees sit or stand on each side of the line and handle and process the chickens as they pass. For example, the wing tips of chickens are cut off by workers located along the assembly line using clippers.

The areas of the assembly line requiring human intervention to physically process the chickens are the most costly and volume limiting. In kosher processing, chickens are covered inside and out with kosher salt. Historically, this salting is performed by hand. This requires workers to salt the body cavities, neck skin and exterior of each chicken on the line. This hand processing is laborious, time consuming, and inefficient. Furthermore, it is wasteful of salt.

SUMMARY OF THE INVENTION

The invention addresses the deficiencies of the prior art by, in various embodiments, providing an automated machine and related methods for coating a sample with a particulate. In various implementations, the sample is a food product, such as meat, but this need not be the case. In some particular embodiments, the food product is poultry, such as chicken, and the particulate is a seasoning, such as salt.

In one aspect, the machine includes a housing through which an overhead conveyor may pass. According to some configurations, the housing is cylindrical in nature. However, in alternative embodiments the housing may have any suitable shape.

According to one embodiment, the seasoning machine includes one or more paddle wheel assemblies disposed within the housing. In one implementation, the machine includes two paddle wheel assemblies disposed radially adjacent to each other within a lower portion of the housing and extending along at least a portion of the length of the housing. Each paddle wheel assembly includes a shaft and a plurality of blades dispersed around and projecting radially from the shaft. According to a further configuration, the axes about which the paddle wheel assemblies rotate are substantially parallel to each other and to a longitudinal axis of the housing.

According to a further embodiment, the poultry seasoning machine of the invention also includes one or more paddle wheel motors mechanically coupled to the shafts of the paddle wheel assemblies for rotating the paddle wheel assemblies in complimentary directions (e.g., one in a clockwise direction and one in a counter clockwise direction) such that the radially projecting blades on the paddle wheel assemblies sweep seasoning, such as salt, loaded into the bottom of the housing in an upward direction toward poultry passing through the housing via the overhead conveyor. The upwardly swept seasoning acts to coat the poultry inside and out.

Optionally, the poultry seasoning machine of the invention also includes one or more blower assemblies and perforated ducting extending from the one or more blower assemblies along the bottom of the housing. The blower assemblies draw in fresh air and gust it out the perforations in the ducting. The force created by air exiting the perforations propels seasoning in the bottom of the housing up toward the overhanging poultry. The upwardly propelled seasoning further coats the poultry inside and out, including the neck skins and internal cavities. Propelling the seasoning in this fashion also helps to spread it throughout the bottom portion of the housing. According to some embodiments, the blower assembly gusts air constantly. However, in other embodiments, it gusts the air periodically.

According to another embodiment, the poultry seasoning machine of the invention includes a seasoning feed for providing seasoning into the housing. The seasoning feed may be coupled, for example, to a hopper or other gravity feed to supply seasoning into the housing. In one or more embodiments, gravity acts on the seasoning from seasoning feed to cover a lower portion of the housing with seasoning. According to one implementation, the seasoning feed contains an auger or similar helical shaped structure. The auger serves to provide seasoning into the housing at a predetermined rate. Specifically, knowing the pitch and the revolutions per minute at which the auger turns, an operator can control the ingress of seasoning into the housing.

The poultry seasoning machine may also include one or more dust collection ports. In practice, the dust collection ports remove from the interior of the housing impurities and/or particulate matter contained in the air and/or seasoning.

According to an additional feature, the seasoning machine also includes a conveyor guard. The conveyor guard extends the length of the housing and extends downward over the conveyor to shield the conveyor from seasoning being fed into the machine and from seasoning being propelled by the blower and paddle wheel assemblies. In some implementations, the conveyor guard tapers inward to further limit the seasoning's access to the conveyor mechanism and hook hanging assemblies associated with the conveyer.

According to a further feature, the seasoning machine also includes one or more viewing windows in the side of the housing to allow operators to view the seasoning process taking place within the housing.

The automated seasoning machine may have a user interface. In some implementations the user interface includes one or more electromechanical switches, for example, including on and off switches. In some implementations, processing speed switches may be included, for example, to vary the air pressure from the blower assembly, the speed at which the paddle wheel assemblies turn, and/or the speed at which the conveyor passes the poultry through the seasoning machine.

According to other embodiments, the automated seasoning machine of the invention includes a processor having any conventional graphical user interface for controlling any of the operational parameters of the seasoning machine, for example, including air pressure from the blower assemblies, speed of the paddle wheel assemblies, speed of the conveyer, and the provision of seasoning into the housing.

The automated seasoning machine of the invention may also include one or more sensors, for example, for sensing seasoning levels in the housing and used to trigger provision of additional seasoning in response to a low seasoning level being detected.

BRIEF DESCRIPTION OF THE DRAWING

These and other features and advantages of the invention will be more fully understood by the following illustrative description with reference to the appended drawings, in which like elements are labeled with like reference designations and which may not be to scale.

ILLUSTRATIVE DESCRIPTION

As described above in summary, the invention is generally directed to a machine and related methods for coating a sample with a particulate. The following illustrative embodiments are described with respect to employing the machine and methods of the invention for automatedly salting poultry during kosher poultry processing. However, the machine and methods of the invention may be used to coat any suitable sample with any suitable particulate.

Figure 1:
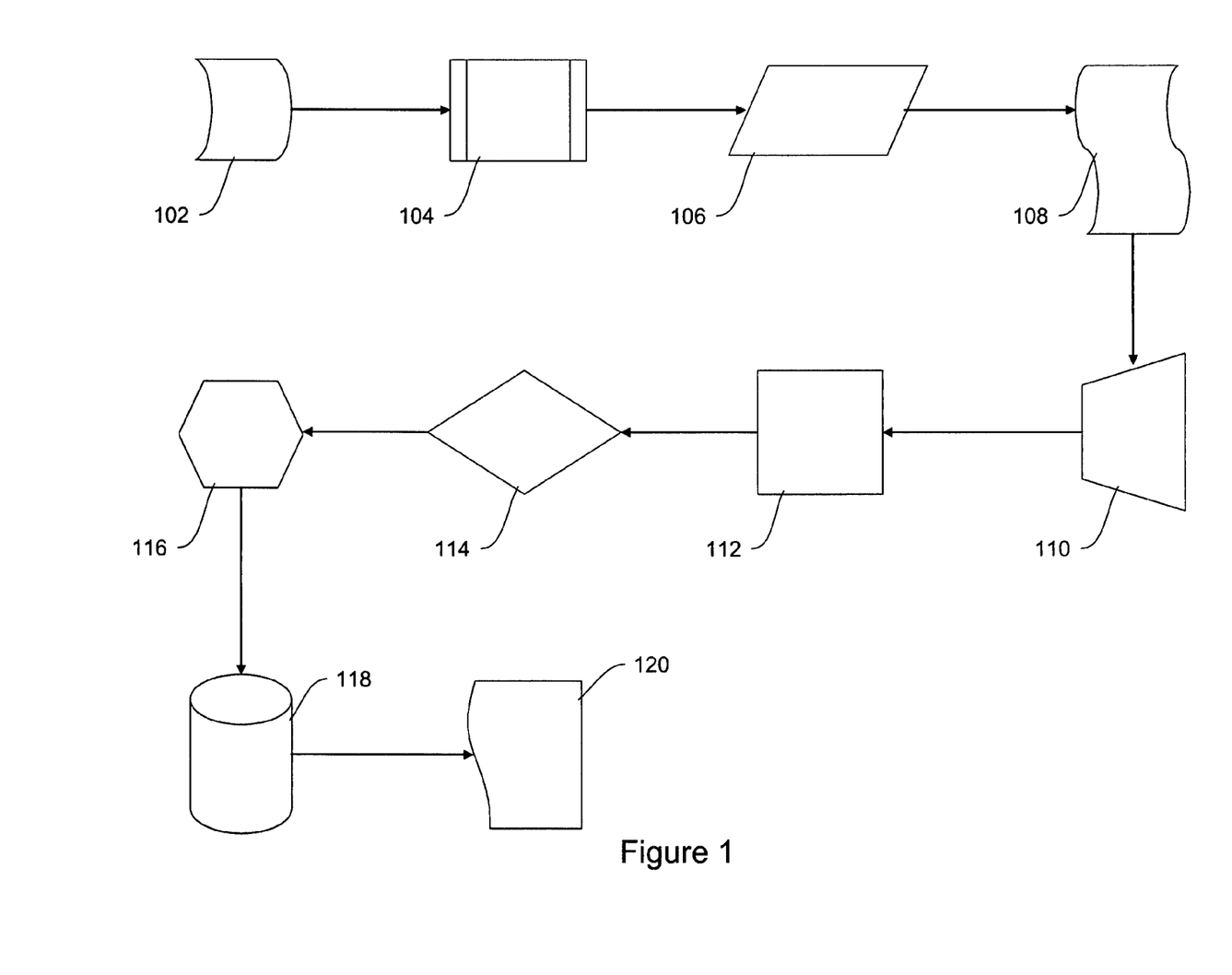
FIG. 1 is a conceptual diagram of a poultry processing assembly line including an automated seasoning machine according to an illustrative embodiment of the invention.

FIG. 1 is a conceptual diagram of a kosher poultry processing assembly line 100 including an automated salting machine 112 according to an illustrative embodiment of the invention. The assembly line 100 includes kill room 102, automatic plucker 104, foot removal station 106, evisceration station 108, soak tank 110, automated poultry salter 112, conveyor ride 114, rinse station 116, chiller 118, and a further processing station 120.

Chickens are received in the kill room 102 and hung upside down in shackles on a conveyor line. Their throats are then cut in accordance with rabbinic practices, and they are allowed to bleed-out.

Subsequent to the bleed-out in the kill room 102, the chicken carcasses travel via the conveyor line to an automatic plucker 104. The automatic plucker 104 includes two walls with rotating discs affixed thereto. Finger-like extensions are affixed to rotating discs. The finger-like extensions disposed on the rotating discs strip the feathers off the chicken carcasses between the two walls of the automated plucker wall 104.

The chicken carcasses then pass into a foot removal station 106. At the foot removal station 106, the chicken carcasses are removed from the shackles and their feet are amputated by hand. Subsequently, the chicken carcasses pass an evisceration station 108. At the evisceration station 108, the internal organs of the chicken carcasses are removed. Eviscerated carcasses then travel to the soak tank 110.

In the soak tank 110, the carcasses are soaked in water, in accordance with rabbinic practices. Soaking chicken carcasses in water causes the water to diffuse and displace any blood that may be contained in carcass meat. After the chicken carcasses soak for a predetermined period of time in accordance with rabbinic standards, they are hung by hooks from an overhead conveyor and pass to the automated poultry salter 112 of the invention.

The salting removes the remaining blood cells that may be left within the carcass meat and kills any bacteria, such as salmonella. Conventionally, this process is done by hand, wherein workers stuff salt into the cavity of each chicken carcass. The automated poultry salting machine 112 of the invention is discussed in more detail below with respect to FIGS. 2-5.

When the chicken carcasses exit the automated poultry salting machine 112, they are removed from the conveyor and placed onto a slow moving conveyor belt 114. The chicken carcasses remain on the conveyor belt 114 for a predetermined period of time (e.g., approximately one hour). This predetermined period of time accords with rabbinic standards. The chicken carcasses then pass to the rinse station 116.

Salt filled chicken carcasses are triple rinsed in rinse station 116 then pass on to chilling chamber 118, wherein the chicken carcasses are chilled to a predetermined temperature. The chilled chicken carcasses pass to further processing station 120. Further processing station 120 can include, for example, rendering the chicken carcasses into separate parts and/or packaging them for delivery.

FIGS. 2-5 depict various views of an automated poultry salting machine 112 according to an illustrative embodiment of the invention. The salting machine 112 includes a housing 202 rigidly and securely mounted on a platform 205. The housing 202 is substantially cylindrical in shape, is about 1½-3 meters long, about 1⅓ meters in diameter, and has partially capped entry 206 and exit 204 ends. As shown most clearly in FIGS. 3 and 4, the partially capped entry 206 and exit 204 include cutouts 203b and 203a, respectively, sized and shaped for allowing poultry carcasses to travel in and out of the salting machine 200 on hooks, such as the hook 205, via an overhead conveyor 207.

The automated poultry salting machine 112 also includes first and second paddle wheel assemblies 208 and 210, respectively, disposed radially adjacent to each other within a lower portion of the housing 202. A first drive motor 212 provides torque to rotate the first paddle wheel assembly 208, and a second drive motor 214 provides torque to rotate the second paddle wheel assembly 210. For illustrative purposes, the first 212 and second 214 drive motors are depicted and described as being mounted to the platform 205 at the exit end 112a of the salting machine 200. However, as indicated in phantom, the drive motors 212 and 214 may alternatively be mounted on the platform 205 at the entrance end 112b of the salting machine 200. According to the illustrative embodiment, the salting machine 202 may employ any conventional AC or DC electric motor, or any conventional internal combustion motor. Additionally, the drive motors 212 and 214 may be variable or fixed speed motors.

Figure 5:
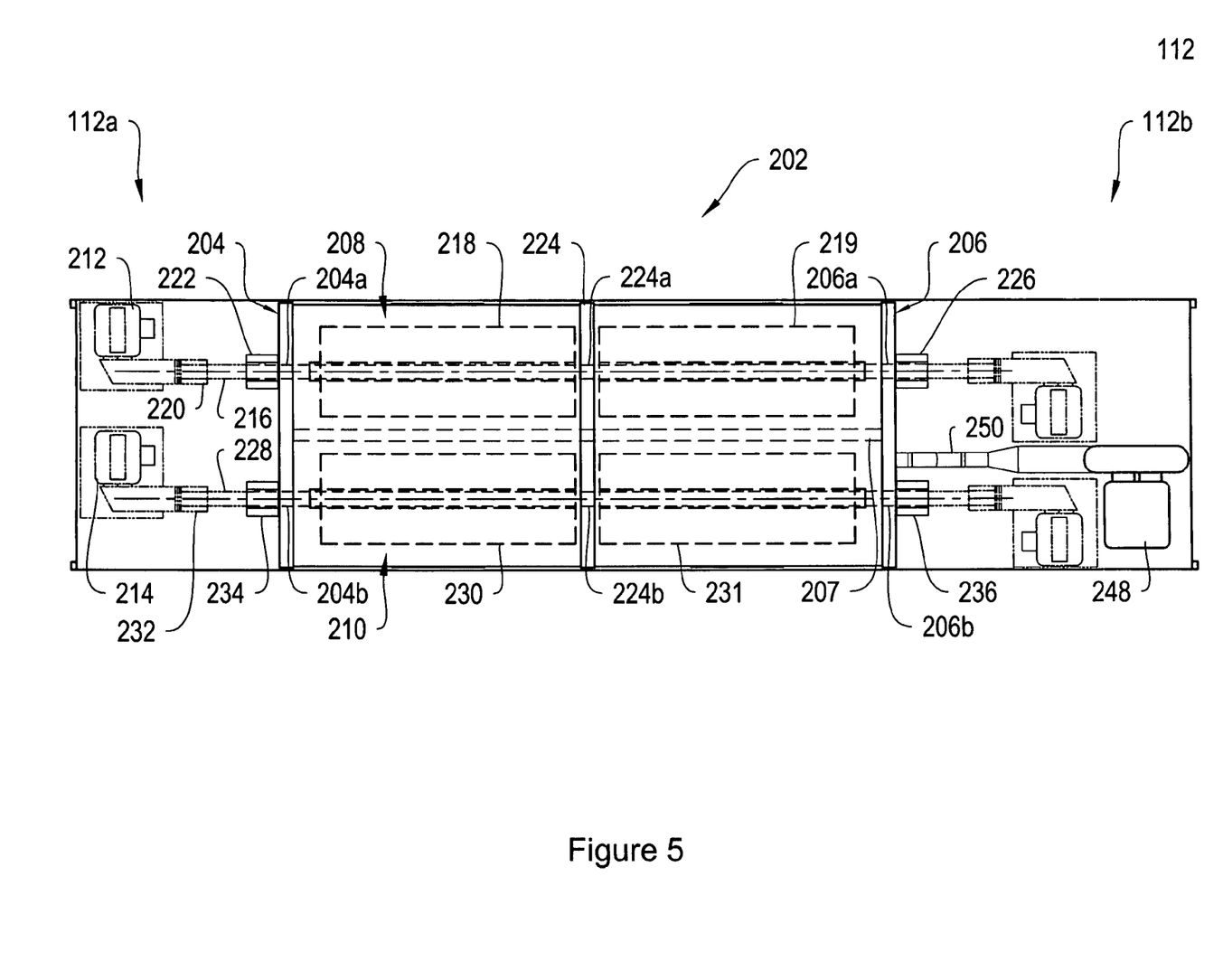
FIG. 5 is a top longitudinal view partially in phantom and partially in cross-section of the automated seasoning machine of FIG. 2.

The first paddle wheel assembly 208 includes a shaft 216 and two blade assemblies 218 and 219. Referring particularly to FIG. 5, the shaft 216 extends axially along the length of the housing 202. More specifically, the shaft 216 attaches to the motor 212 for rotational interoperation by way of a conventional fitting 220, and extends through an aperture 204*a* in the end cap 204 via a conventional rotational coupler 222, through a conventional rotational fitting 224*a* in an intermediate support bracket 224, and through an aperture 206*a* in the end cap 206 by way of a conventional rotational coupler 226. The first blade assembly 218 slidably interfits over and affixes to the shaft 216, and extends from about 4-6 inches inside the end cap 204 to about 1-2 inches short of the intermediate support 224. Similarly, the second blade assembly 219 slidably interfits over and affixes to the shaft 216, and extends from about 4-6 inches inside the end cap 206 to about 1-2 inches short of the intermediate support 224.

In a similar fashion to the first paddle wheel assembly 208, the second paddle wheel assembly 210 includes a shaft 228 and two blade assemblies 230 and 231. Referring again to FIG. 5, the shaft 228 extends axially along the length of the housing 202 and is substantially parallel to and at about the same height as the shaft 216 of the first paddle wheel assembly 208. More specifically, the shaft 228 attaches to the motor 214 for rotational interoperation by way of a conventional fitting 232, and extends through a conventional rotational fitting 204*b* in the end cap 204 via a conventional rotational coupler 234, through an aperture 224*b* in the intermediate support bracket 224, and through an aperture 206*b* in the end cap 206 by way of a conventional rotational coupler 236. The first blade assembly 230 slidably interfits over the shaft 228 and extends from about 4-6 inches inside the end cap 204 to about 1-2 inches short of the intermediate support 224. Similarly, the second blade assembly 231 slidably interfits over the shaft 216 and extends from about 4-6 inches inside the end cap 206 to about 1-2 inches short of the intermediate support 224.

The shafts 216 and 228 are depicted as coupling directly to the motors 212 and 214, respectively. However, in other illustrative embodiments, gearing may be employed to interface the motors 212 and 214 with the shafts 216 and 228. According to some configurations, a differential may be employed to enable a single motor to drive both shafts 216 and 228.

Figure 3:
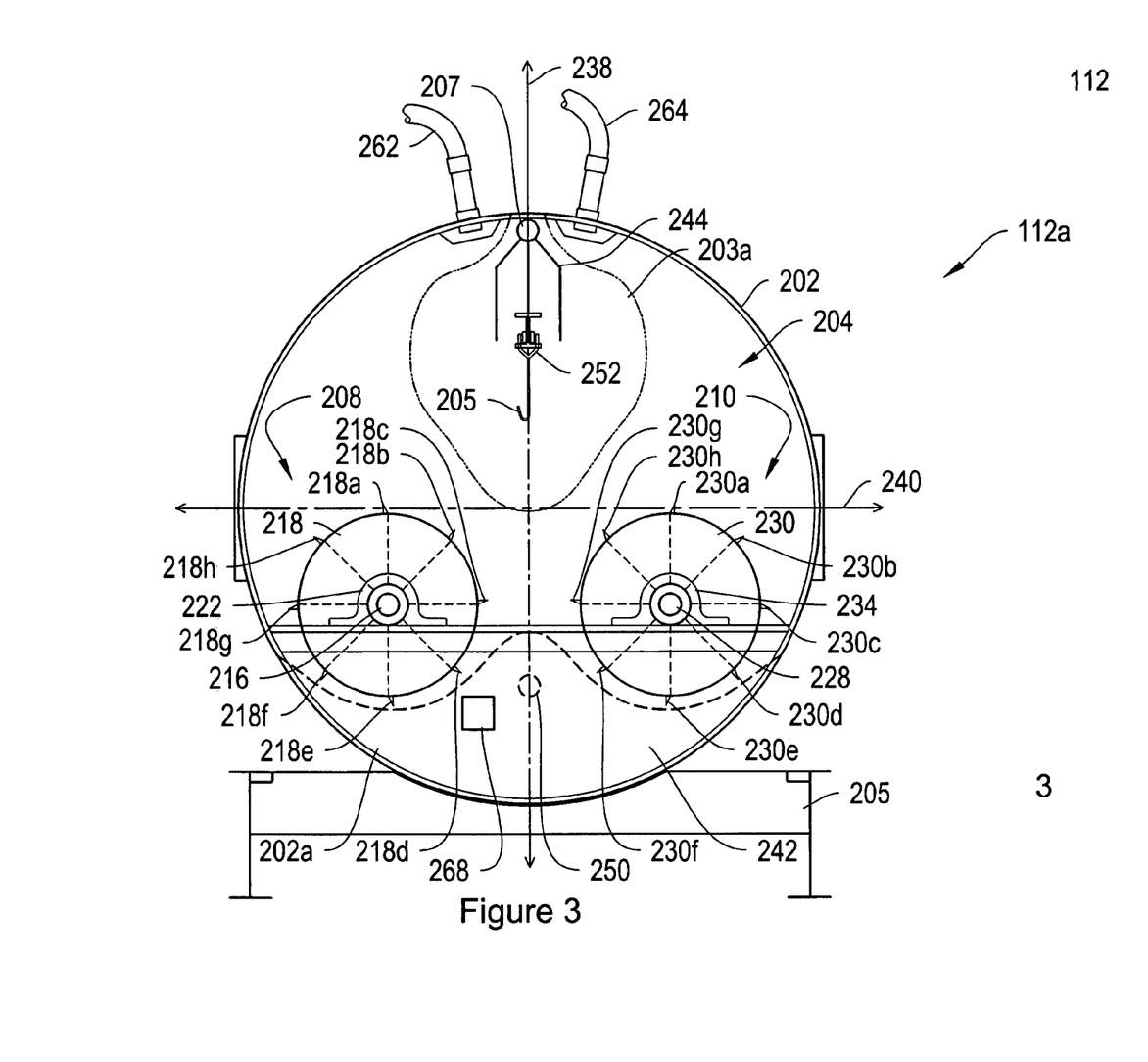
FIG. 3 is a cross-sectional end view of the automated seasoning machine of FIG. 2 taken along line 3-3.

Referring to both the top view of FIG. 5 and the cross-sectional exit end view of FIG. 3, the first blade assembly 218 of the first paddle wheel assembly 208 includes eight radially projecting blades 218*a*-218*h*, which extend axially substantially the entire length of the blade assembly 218. In a similar fashion, the first blade assembly 230 of the second paddle wheel assembly 210 also includes eight radially projecting blades 230*a*-230*h*, which extend axially substantially the entire length of the blade assembly 230. According to the illustrative embodiment, each blade 218*a*-218*h* and 230*a*-230*h* are about 3 feet, 4 inches long, about 7⅝ inches wide, about ¼ inches thick, and are made from stainless steel.

Figure 4:
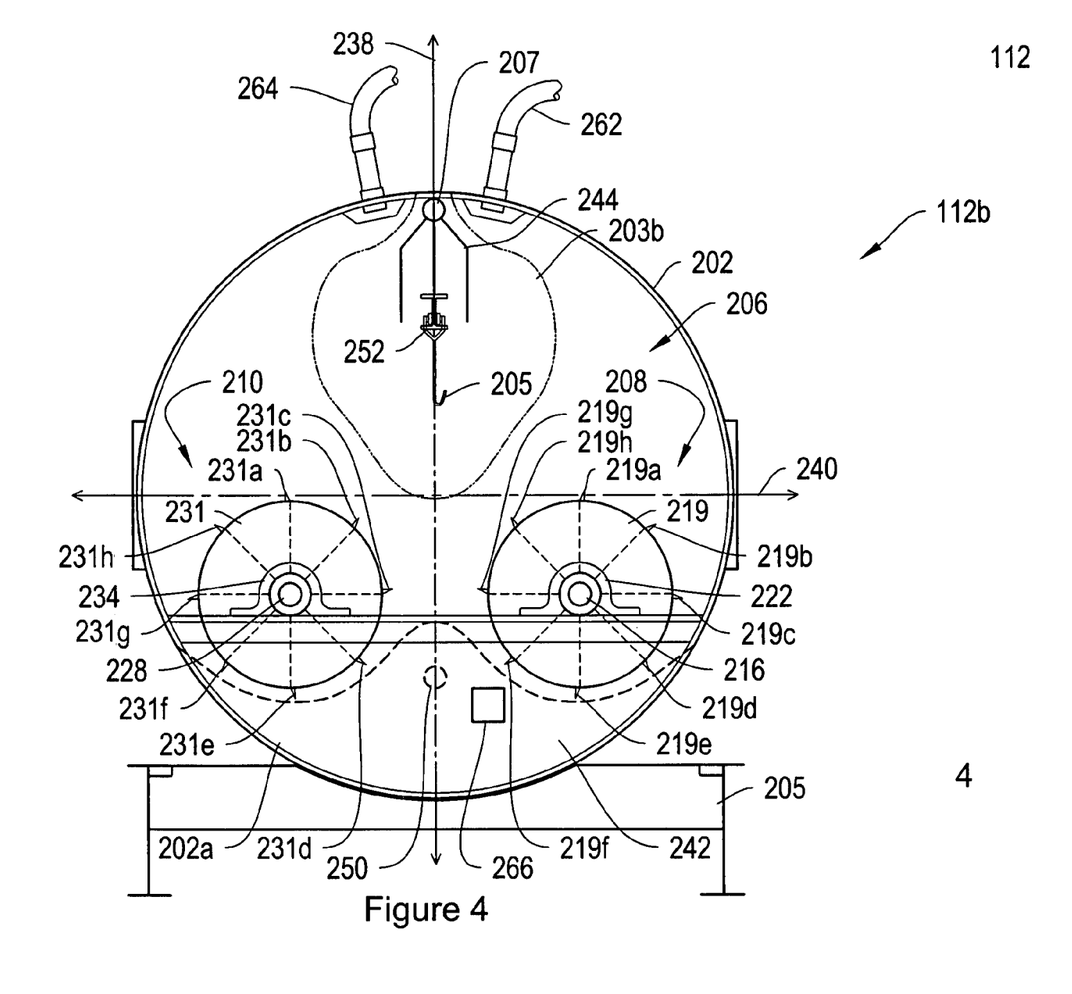
FIG. 4 is a cross-sectional end view of the automated seasoning machine of FIG. 2 taken along line 4-4.

Referring to both the top view of FIG. 5 and the cross-sectional entrance view of FIG. 4, the second blade assembly 219 of the first paddle wheel assembly 208 includes eight radially projecting blades 219*a*-219*h*, which extend axially substantially the entire length of the blade assembly 219. In a similar fashion, the second blade assembly 231 of the second paddle wheel assembly 210 also includes eight radially projecting blades 231*a*-231*h*, which extend axially substantially the entire length of the blade assembly 231. According to the illustrative embodiment, each blade 219*a*-219*h* and 231*a*-231*h* are about 3 feet, 4 inches long, about 7⅝ inches wide, about ¼ inches thick, and are made from stainless steel.

As shown in FIGS. 3 and 4, the paddle wheel assemblies 208 and 210 are symmetrically located on either side of the vertical axis 238 of the housing 202 at about the same height, and are positioned in close enough proximity to each other to maximize interoperation of the assemblies 208 and 210 to project salt 242 upward toward poultry hanging from the conveyor 207. The shafts 216 and 228 are also located sufficiently below the housing horizontal axis 240 to enable the paddle blades 219*a*-219*h* and 231*a*-231*h* to scoop up the salt 242 from a bottom portion 202*a* of the housing 202.

Figure 2:
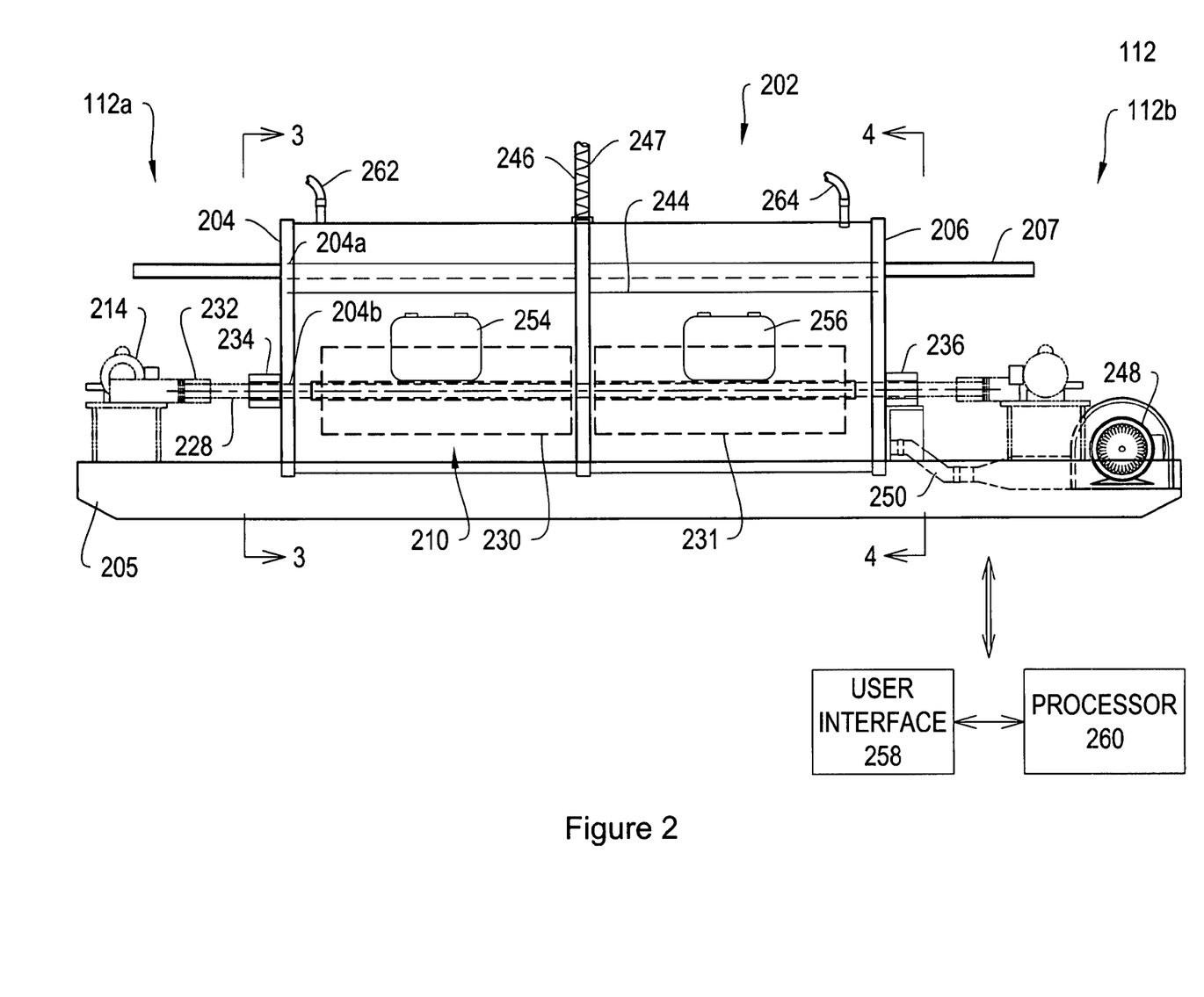
FIG. 2 is a longitudinal side view partially in phantom and partially in cross-section of an automated seasoning machine according to an illustrated embodiment of the invention.

According to another feature, as shown in FIGS. 2 and 5, the salting machine 112 includes a blower motor assembly 248. Referring also to FIGS. 3 and 4, the salting machine 112 also includes ducting 250 extending from the blower motor assembly 248 along the bottom 202*a* of the housing 202 between the paddle wheel assemblies 208 and 210. According to the illustrative embodiment, the portion of the ducting extending between the entrance cap 204 and the exit cap 206 is perforated. According to the illustrative embodiment, the blower motor assembly 248 draws in ambient air and forces the air into the ducting 250, either continuously or intermittently. A force created by air being expelled from the perforations in the ducting 250 propels the salt 242 from the bottom of the housing 202 upwards toward hanging chicken carcasses passing through the housing 202 via the conveyor 207.

As shown in FIGS. 2-5, the salting machine 112 also includes a conveyor guard 244 for shielding the conveyor 207 from salt from the salt feed 246, the paddle wheel assemblies 208 and 210, and the ducting 250. Illustratively, the conveyor guard 244 extends axially at least part way between the entry 206 and exit 204 caps and downward over a portion of the hook suspending mechanism 252. Preferably, the conveyor guard 244 extends over the conveyor 207 for the entire or substantially entire length of the conveyor extending through the housing 202. According to some configurations, the conveyor guard 242 tapers or is bent inward toward the hook 205 to further limit the exposure of the conveyor 207 and the mechanism 252 to the salt 242.

According to a further feature, the salting machine 112 also includes one or more viewing windows 254 and 256 in the side of the housing 202 to allow operators to view the salting process taking place within the housing 202. As depicted, the windows 254 and 256 may be covered by doors, or alternatively, may be uncovered plastic or safety glass windows.

As shown most clearly in FIG. 2, the salting machine 112 includes a salt feed 246 for providing salt into the housing 202. The salt feed 246 may be coupled, for example, to a hopper or other gravity feed to supply salt into the housing 202. In one or more embodiments, gravity acts on the salt from salt feed 246 to cover a lower portion of the housing 202. According to one implementation, the salt feed 246 contains an auger 247 or similar helical shaped structure. The auger 247 serves to provide salt into the housing 202 at a predetermined rate. Specifically, knowing the pitch and the revolutions per minute at which the auger turns, an operator can control the ingress of salt into the housing 202.

The poultry salting machine 112 may also include one or more dust collection ports 262 and 264. In practice, the dust collection ports 262 and 264 remove from the interior of the housing 202 impurities and/or particulate matter contained in the air and/or salt 242.

The automated salting machine 112 may have a user interface 258. In some implementations, the user interface 258 includes one or more electromechanical switches, for example, including on and off switches, for example, to switch the paddle wheel assembly motors 212 and 214, the blower motor assembly 248, and/or the conveyor 207 on and off. In some implementations, processing speed switches may be included, for example, to vary the air pressure from the blower motor assembly 248, the speed at which the paddle wheel assemblies 208 and 210 turn, and/or the speed at which the conveyor passes 207 the poultry through the salting machine 212.

According to other illustrative embodiments, the automated salting machine 212 includes a processor 260 including any conventional computer having any conventional graphical user interface for controlling any of the operational parameters of the salting machine 212. Such operating parameters include, for example, air pressure from the blower motor assembly 248, speed of the paddle wheel assemblies 208 and 210, speed of the conveyor 207, and the provision of salt into the housing 202 from the salt feed 246.

As shown in FIGS. 3 and 4, the automated salt machine 212 of the invention may also include one or more conventional sensors 266 and 268, for example, for sensing salt levels in the housing 202 and used to trigger provision of additional salt in response to a low salt level being detected.

In operation, poultry are hooked onto the conveyor 207 by way of hooks, such as the hook 205. The conveyor 207 passes the poultry through the housing 202 through the aperture 203b in the entrance cap 206. The poultry passes over the paddle wheel assemblies 208 and 210 turning in complimentary directions to propel salt up toward the poultry to coat both interior and exterior surfaces of the poultry, for example, including the neck and other body cavities. As the poultry pass over the paddle wheel assemblies 208 and 210, the blower motor assembly 248 gusts air through the perforated conduit 250. Air gusting out of the perforations propels additional salt upward, further acting to coat the poultry inside and out. The salt coated poultry pass out of the housing 202 via an aperture 203a in the exit end cap 204.

One advantage of the invention is that it includes the dual salt coating action of the paddle wheel assemblies 208 and 210 in combination with the gusting air. Another advantage of the invention is that the salt is propelled both directly at the poultry by way of the paddle wheel assemblies 208 and 210 and the blower motor assembly 248, and indirectly by salt deflecting off the inner walls of the housing 202.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

For example, the disclosed invention may be used to apply spices to poultry, other meats or other food products. According to other implementations, the invention may be employed to coat/treat other non-food products with a particulate distributed along the bottom of the housing 202. Additionally, any suitable number of paddle wheel assemblies may be employed. Also, the blower assembly may be replaced with or include a compressed air device. In some embodiments, the blower assembly may not be used at all.

What is claimed is:

1. An automated machine for seasoning poultry comprising,
 a housing having sides for containing, at least in part, the seasoning, and apertures at entrance and exit ends sufficiently large to enable poultry to pass into, through and out of the housing via an overhead conveyor mechanism, wherein the poultry is removably suspended from the overhead conveyor mechanism,
 a seasoning projecting mechanism disposed in the housing for projecting seasoning contained within the housing at the poultry as it passes between the entrance and exit apertures, and
 at least one blower assembly including a blower motor and ducting, the ducting in fluid communication with the blower motor, having perforations and extending along a bottom portion of the housing, the blower being configured to draw in air and gust it out through the perforations in the ducting, a force created by the air exiting the perforations being sufficient to propel seasoning in a bottom portion of the housing up toward the poultry,
 wherein the seasoning projecting mechanism includes at least one paddle wheel assembly rotatably mounted within the housing and including a plurality of radial projections sized and shaped to sweep seasoning toward the poultry in response to the paddle wheel assembly rotating.

2. The machine of claim 1 including a motor for rotating the at least one paddle wheel assembly.

3. The machine of claim 1, wherein the seasoning projecting mechanism includes first and second paddle wheel assemblies disposed radially adjacent to each other within the housing and extending along at least a portion of a length of the housing, each paddle wheel assembly including a shaft and a plurality of blades dispersed around and projecting radially from the shaft, the shaft of each paddle wheel assembly being substantially parallel to each other and to a longitudinal axis of the housing.

4. The machine of claim 3, wherein the first and second paddle wheel assemblies rotate in complimentary directions.

5. The machine of claim 1, wherein the housing is substantially cylindrical with the exit and entrance ends corresponding to axially opposed end of the cylinder.

6. The machine of claim 1 including a rigid base to which the housing is secured.

7. The machine of claim 1, wherein the at least one blower assembly is configurable for gusting air substantially constantly.

8. The machine of claim 1, wherein the at least one blower assembly is configurable for gusting air intermittently.

9. The machine of claim 1 including a seasoning feed through which seasoning may be provided into the housing.

10. The machine of claim 9, wherein the seasoning feed is sized and shaped for interconnection with a gravity fed seasoning filled hopper.

11. The machine of claim 9, wherein the seasoning feed includes a conduit through which seasoning may pass and a helical shaped structure rotatably disposed within the conduit, the helical shaped structure having a pitch and being rotated at a selected rate to control ingress of the seasoning into the housing.

12. The machine of claim 1 comprising a conveyor guard, extending downward and over the conveyor mechanism passing through the housing to shield the conveyor from seasoning being fed into the machine and from seasoning being propelled by the seasoning projecting mechanism.

13. The machine of claim 1 comprising one or more viewing windows in a side of the housing to allow operators to view a seasoning process taking place within the housing.

14. The machine of claim 1 comprising a user interface, the user interface including one or more controls for controlling aspects of operation of the machine.

15. The machine of claim 14, wherein the one or more controls include a control for altering a speed at which seasoning is fed into the housing.

16. The machine of claim 14, wherein the one or more controls include a control for altering a at least one of a quantity of speed at which seasoning is fed into the housing and speed at which the seasoning is propelled from the seasoning projection mechanism.

17. The machine of claim 14, wherein the one or more controls include a control for altering rotational speed of a paddle wheel assembly included in the seasoning projecting mechanism.

18. The machine of claim 14, wherein the one or more controls include a control for altering a velocity at which air is expelled from a blower assembly included in the seasoning projecting mechanism.

19. The machine of claim 14, wherein the one or more controls are provided via a graphical user interface.

20. The machine of claim 1 comprising a sensor for detecting an amount of seasoning contained within the housing.

21. The machine of claim 1 comprising at least one air filter for removing airborne impurities from within the housing.

* * * * *